United States Patent [19]
Robinson

[11] 3,753,577
[45] Aug. 21, 1973

[54] SPORTING VELOCIPEDE

[76] Inventor: Russell G. Robinson, 19301 McLaren Street, Huntington Beach, Calif. 92646

[22] Filed: Mar. 2, 1971

[21] Appl. No.: 120,120

[52] U.S. Cl.................... 280/261, 280/274, 280/282
[51] Int. Cl............................ B62k 5/06, B62k 9/02
[58] Field of Search................... 280/261, 274, 259, 280/282; 280/87.04 R

[56] References Cited
UNITED STATES PATENTS

| 571,069 | 11/1896 | Humbrecht | 280/261 |
| 3,177,962 | 4/1965 | Bailey | 280/282 X |
| 690,733 | 1/1902 | Jarvis | 280/261 |
| 2,147,732 | 2/1939 | Boynton | 280/261 |
| 3,222,078 | 12/1965 | Clarke | 280/261 X |

FOREIGN PATENTS OR APPLICATIONS

| 709,378 | 8/1931 | France | 280/261 |
| 501,515 | 11/1954 | Italy | 280/261 |
| 496,086 | 11/1938 | Great Britain | 280/261 |
| 744,065 | 4/1933 | France | 280/261 |

Primary Examiner—Kenneth H. Betts
Assistant Examiner—John P. Silverstrim
Attorney—Robert E. Strauss

[57] ABSTRACT

A sport vehicle is described which comprises a three-wheeled velocipede having an arrangement of seat, pedal assembly and handle bars that achieves maximum maneuverability and speed. This arrangement comprises seat means positioned on the frame between the rear wheels, preferably below their axle height, pedal and crank assembly means positioned on the forward portion of the frame at an elevation that is preferably about the seat with interconnecting drive means to one or both rear wheels, and handle bar means between the seat and pedal assembly for steering the vehicle.

7 Claims, 4 Drawing Figures

Patented Aug. 21, 1973    3,753,577

INVENTOR.
RUSSELL G. ROBINSON
BY
ATTORNEY

SPORTING VELOCIPEDE

DESCRIPTION OF THE INVENTION

This invention relates to a sport and racing vehicle, and, in particular, relates to a three-wheeled velocipede having a construction that achieves maximum speed and maneuverability.

Various arrangements in the positions of the seat, pedals and/or handle bars of velocipedes have been tried for a variety of purposes. In different modifications, the seat has been purposely moved rearwardly of the rear wheels to permit stunt riding by lifting of the front wheel; the steering mechanism has been separated from the front wheel fork and placed on a separate support; the seat has been lowered to avoid accidental tipping of a tricycle, etc.

Heretofore, however, no single vehicle has been designed that would permit operation with maximum speed, maneuverability and stability while still presenting an attractive and sporty appearance.

It is, therefore, an object of this invention to provide a sporting and racing vehicle, preferably a velocipede.

It is also an object of this invention to provide a three-wheeled velocipede that possesses maximum maneuverability.

It is a further object of this invention to provide such a velocipede with an arrangement of seat, handle bars and pedals that will permit application of maximum force to the pedal and propulsion means.

Other and related objects will be apparent from the following description of the invention.

I have found that the aforementioned objects can be attained in a vehicle provided that the three major elements comprising the body support means, foot propulsion means and hand grip means are properly located on the frame to provide an extremely low center of gravity and to permit application of the rider's body forces in such a manner that the rider can apply his full strength to the propulsion means while, nevertheless, being retained in a stable riding position.

Briefly the arrangement of these major elements for a three-wheeled velocipede having a forward wheel rotatably supported by a fork pivotably secured to a frame and a pair of wheels rotatably supported at the rear of the frame comprises rider body support means supported by the frame between the rear wheels at an elevation no greater than that of the axles thereof, foot operated propulsion means supported by a forward portion of the frame at an elevation no less than the elevation of the body support means, mechanical linking means operatively connecting the propulsion means to a driving relationship on at least one of the rear wheels, and hand grip means positioned between the body support means and the propulsion means.

Preferably, the rider body support means, e.g., the seat, is supported at a substantially lower elevation than the rear wheel axles so that the center of gravity of the rider's weight has a negligible or minimum lever moment tending to raise the inside wheel on sharp turns. Also, it is preferred to locate the foot propulsion means, e.g., a pedal, crank and drive sprocket assembly, at a greater elevation than the seat so that the reaction of from the applied force on the pedals tends to force the rider downwardly against the seat. Finally, to maximize the body and arm forces that can be combined with the leg force applied to the pedals, it is preferred that the included angle between a line passing through the center of the hand grip means, e.g., handle bars, and the seat and a line passing between the pedal assembly and the seat be no greater than about 45 degrees, most preferably no greater than about 30 degrees.

The aforementioned features and their effect on the maneuverability and speed of a velocipede will be described in greater detail by reference to the FIGURES, of which:

Figure 1:
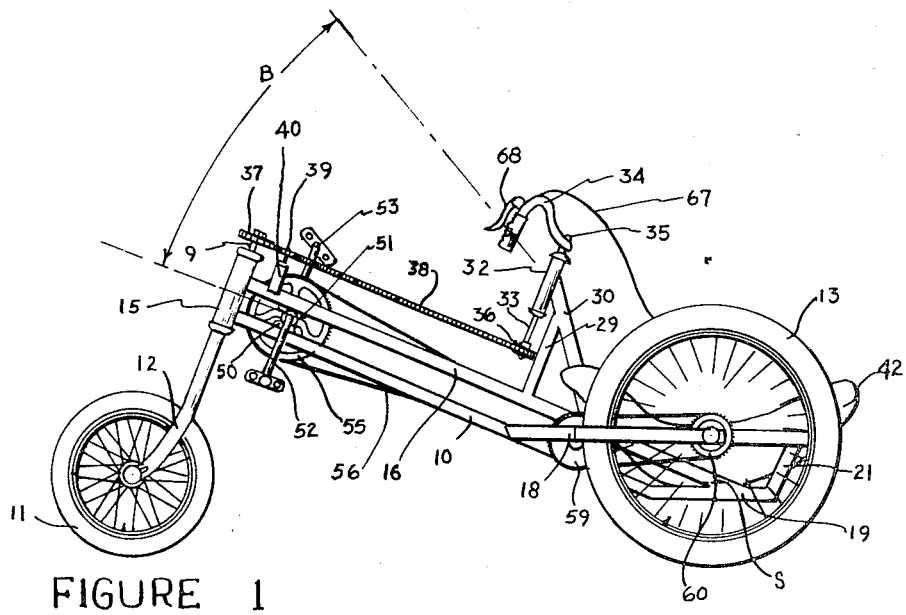
FIG. 1 is an elevation view of the velocipede.

Referring now to FIG. 1, the vehicle shown is a three-wheeled velocipede having a front wheel 11 and rear wheels 13 and 14 supported at opposite ends of its frame. The frame is formed of one or more longitudinal members 10 and 16 that are secured to the head 15 which comprises a conventional sleeve with internal bearings for a journalled support of spindle 9 which is secured to fork 12. The latter is a conventional bifurcated fork that supports front wheel 11 in a rotatable mounting. Conventional ball bearings are provided in the spindle of wheel 11.

The longitudinal members 10 and 16 are secured to a short horizontal member 19 that is attached to a rear, upright bar 21. Right and left wing members 17 and 18 project outwardly from a mid portion of lower member 10. The structure of the latter wing members is shown in greater detail in FIG. 2, and comprises a polygona' side frame formed of side bars 20 and 23 and rear bars 22 and 25. The upper end of upright bar 21 is attached to bars 22 and 25 at their junction along the mid-line of the vehicle. The forward wing bars 17 and 18 project to the outside of bars 20 and 23 and terminate in a junction with outboard bars 24 and 27. The latter, together with bars 20 and 23 form support forks in which wheels 14 and 13 are rotatably mounted on the frame. These bars are bored to receive opposite ends of a conventional threaded spindle of wheels 13 and 14 with lock nuts 28 used to secure the spindles in the frame. Alternatively, brackets can be secured to the tubular members by welding, etc., and these plate-shaped brackets can have suitable apertures for mounting of the wheel spindles. Suitable apertures are slots or bores in the plates which are used as brackets.

The upper longitudinal frame member 16 bears an upright post 30 near its rear end and a brace bar 29 that projects upwardly to support post 30 at a point intermediate its length. The positions of these members can be switched, e.g., post 30 can be positioned forward of brace 29 and can be inclined rearwardly towards the seat. Attached to the upper end of post 30 is sleeve 32 that provides a journalled mounting for shaft 33 with conventional ball or needle bearings. The upper end of shaft 33 is attached to handle bars 34 with conventional means, e.g., a splinded or keyed joint with nut 35 securing the assembly. The lower end of shaft 33 bears mechanical linking means to spindle 9. This is shown as sprocket 36 on shaft 33, a similar sprocket 37 on spindle 9 with chain 38 extending between the sprockets. Correct tension on chain 38 can be maintained by idler sprocket 39 that is carried by frame member 16 with a bracket 40 which permits transverse shifting of the idler to vary the tension on the chain.

The rider body support means comprises the seat 42 which is preferably a contoured or bucket seat such as shown. The center of the bottom of the seat is at point S, a substantial distance below the axles of the rear wheels. The seat is attached to the frame by lugs 43 and 44 that are mounted on rear bars 25 and 22. The forward portion of the seat is secured to bracket 45 that is attached to frame member 16.

The propulsion means for the vehicle is foot operated and comprises a pedal, crank and drive sprocket assembly which is mechanically linked in a driving relationship to one or both of the rear wheels. The assembly has a conventional spindle which is in a journalled, bearing support by brackets 50 and 51. These brackets are slidably adjustable along frame members 10 and 16 to permit extension or retraction of the assembly along the frame to accommodate for different leg lengths of riders. The opposite ends of the spindle terminate in crank arms 52 and 53 which bear pedals. Drive sprocket 55 is also mounted on the spindle in the conventional manner.

Figure 2:
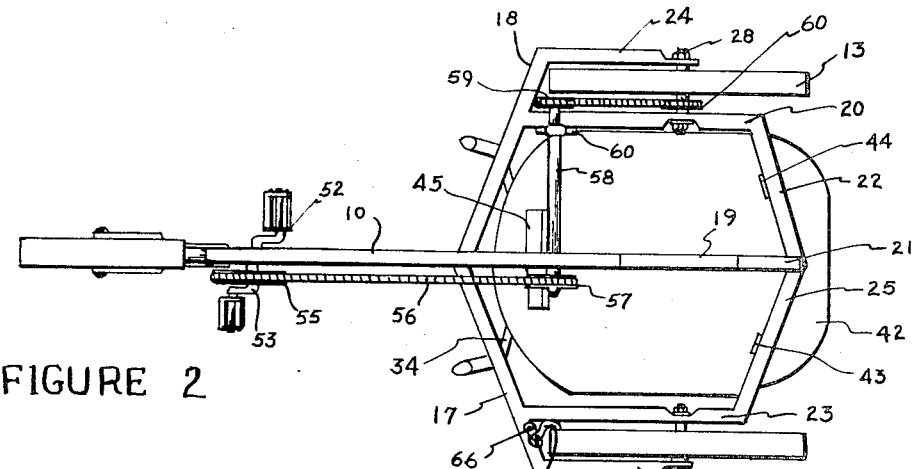
FIG. 2 is a bottom view of the velocipede.

The pedal, crank and drive sprocket assembly is mechanically linked in a driving relationship to wheel 14 by sprocket chain 56 which engages sprocket 57; see FIG. 2. The latter is mounted on shaft 58 which is rotatably supported by a flange bracket (not shown) that extends between members 10 and 16 and by bracket 60 with suitable bearing means. The outboard end of shaft 58 bears sprocket 59 which is in line with sprocket 60 of the drive hub of wheel 14. A conventional coaster hub can be used or, preferably, a multiple speed hub is used. Examples of suitable variable speed devices that can be used on the vehicle are: multiple speed Derailleur hub, two speed kick back hub, three speed internally geared hub, etc.

The vehicle can have conventional braking means such as shown in FIG. 2 as a caliper brake means which comprises arm 65 that is pivotably mounted on wing member 1 by bracket 66. The arm bears a pad that can be forced against the rim of wheel 13 to effect braking by tension applied to cable 67 from hand lever 68; see FIG. 1. Various other braking means can also be used. When coaster hubs are used, braking can be applied to one or both rear wheels. Caliper brakes can be used on any or all wheels, including the front wheel, or shoe and drum brakes can be used on any undriven wheel such as the front or an undriven rear wheel.

As previously mentioned, the essential elements of the velocipede of this invention comprises positioning of the rider seat between the rear wheels, preferably at a lesser elevation than the wheel axles to minimize the lever moment that the rider's weight can apply towards tilting of the vehicle. The vehicle is driven by one or both of the rear wheels for maximum traction, and, preferably, the rear wheels are of larger diameter than the front wheel. The front wheel fork and spindle assembly should have an inclined angle with the horizontal between about 15 and 25 degrees to achieve best handling characteristics and to isure that the front wheel will tend to align itself along the direction of movement. The pedal assembly should have an elevation at least equal to and, preferably, greater than the seat for compactness of the vehicle. The elevation of the pedal assembly above the seat also insures rider stability since the reaction force from the pedals tends to hold the rider in the seat. The hand grips should be positioned between the seat and pedal assembly with an angle B (see FIG. 1) between the straight lines passing through the center of the seat and the hand grips and through the centers of the seat and the pedal assembly being less than about 45 degrees and, preferably, less than about 30 degrees. This insures that the maximum force can be applied to the pedals by correct location of the hand grips to permit the additive application of the arm and body trunk muscles in the total force applied to the pedal drive means.

The vehicle can be formed of conventional and readily available materials. Solid or hollow tubular elements of round, oval or polygonal cross section can be used for the frame construction; square tubular members are illustrated. These members can be interconnected by any suitable means, preferably by welding. Conventional sprocket and roller chain means can be used for the translation of movement between the handle bars and the front wheel assembly. Alternatively, crank arms and a connecting rod could be used. Similarly, a hand wheel could be substituted for handle bars 34. The preferred mechanical linking means between the pedal, crank and sprocket assembly and the rear wheels is the illustrated roller chain means. In a preferred embodiment, both rear wheels are driven and this can be accomplished by extending shaft 58 towards wheel 13, providing a sprocket such as 59 on the end of the shaft, a drive hub on wheel 13 and a roller chain interconnecting the sprockets. The brake means would then, of course, be moved to the outside or rear of the wheel 13. Conventional chain guards can also be provided about chains 56 or 38 as desired.

Figure 3:
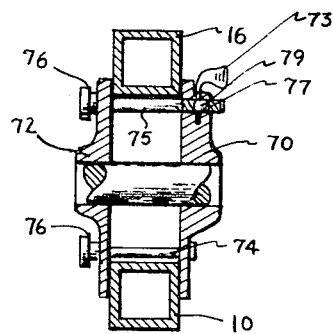
FIGS. 3 and 4 show alternative construction details.

FIG. 3 illustrates the detail of a suitable adjustable means for mounting the pedal, crank and sprocket assembly between members 10 and 16. In this assembly, the crank spindle is journaled on its opposite ends by plates 70 and 72 which have raised bosses on their outside faces that are bored for mounting of the spindle. The edges of the plates are clamped against the members 10 and 16 by machine bolts 74 with thumb nuts 76. At least one of the bolts is as shown at 75 with its end opposite from nut 76 being bored at 77. A cam 79 is inserted in the bore and lever 73 is eccentrically positioned in the cam to permit a quick release of tension on the bolt by movement of lever 73. This permits rapid loosening and repositioning of the pedal assembly on the frame members. Several roller chains of varied lengths can be provided for use with the vehicle or links can be added or removed from the chain as needed to accommodate varied positions of the pedal assembly.

Figure 4:
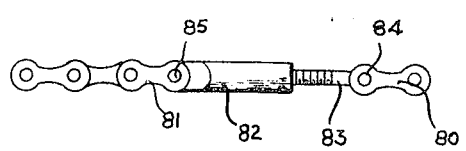

FIG. 4 illustrates an alternative chain tension adjustment means for chain 38. This comprises a telescoping assembly of sleeve 82 and bolt 83 which turns into a threaded bore of the sleeve. The free end of the sleeve fits between the links 81 of the chain with pin 85 inserted into a transverse bore in the end of the sleeve while the free end of bolt 83 fits between the links 84 with pin 85 securing it to the chain. The tension on the chain can simply be adjusted by advancing or retracting the bolt 83.

The illustrated construction employs square tubular members which are welded together. Alternative construction can be used, e.g., many of the welded butt joints shown in the drawings can be replaced with smooth, arcuate bends. A unitized frame and seat construction could also be used wherein the seat can be formed with sufficient rigidity that some or all of the supporting framework shown in the illustrations can be deleted. Thus, the seat could be formed of reinforced plastic such as a polyester or polyolefin or an acrylonitrile, butadiene and/or styrene copolymer which can be filled with reinforcing fibers such as fiberglass, nylon, etc. The fibers can be of suitable length, e.g., chopped fiberglass to permit injection molding of the seat with sufficient rigidity to permit it to be attached directly to the longitudinal frame members. The outboard sides of the seat can be formed with sufficient strength to permit the direct attachment of the rear wheels and or the interconnecting drive means without additional strengthening frame members.

The invention has been described with regard to the presently preferred mode of practice thereof. It is not intended that this description be unduly limiting of the invention, but, rather, it is intended that the invention be defined by the means and their obvious equivalents set forth in the following claims.

What is claimed is:

1. A three wheeled velocipede and the like having a frame comprising a polygonal rear frame section defined by wing and side bar members and a longitudinal frame section supported thereby and projecting along the centerline of said cycle at an inclined angle, upwardly and forwardly, from the polygonal rear frame section, a forward wheel rotatably supported by a fork pivotably secured to the forward portion of said longitudinal frame section for directional control of the velocipede and a pair of wheels rotatably supported by stub axles lying on a common axis and carried by said side bars of said polygonal frame section, seat means carried by said frame at said inclined angle, at an elevation below and at substantially the same longitudinal position of said axis, foot operated propulsion means supported by a forward portion of said longitudinal frame section at an elevation above the elevation of said seat means, mechanical linking means operatively connecting said propulsion means in a driving relationship to at least one of said rear wheels, hand grip means positioned between said seat means and said propulsion means, and means mechanically linking said hand grip means to said fork to effect pivoting thereof on said frame.

2. The velocipede of claim 1 wherein said foot propulsion means comprises a pedal, crank and sprocket assembly.

3. The velocipede of claim 2 wherein the angle between a line passing through the center of the hand grip means and the seat and a line passing through the center of the foot propulsion means and the seat is no greater than about 45 degrees.

4. The velocipede of claim 3 wherein the angle is no greater than about 30 degrees.

5. The velocipede of claim 3 wherein said pedal, crank and sprocket assembly is carried by a bracket that is slidably attached to said longitudinal member to accommodate different leg lengths of riders.

6. The velocipede of claim 3 wherein said longitudinal frame section comprises a pair of bars.

* * * * *